US011256760B1

United States Patent
Corcoran et al.

(10) Patent No.: US 11,256,760 B1
(45) Date of Patent: Feb. 22, 2022

(54) REGION ADJACENT SUBGRAPH ISOMORPHISM FOR LAYOUT CLUSTERING IN DOCUMENT IMAGES

(71) Applicant: Automation Anywhere Inc., San Jose, CA (US)

(72) Inventors: Thomas Corcoran, San Jose, CA (US); Vibhas Gejji, Fremont, CA (US); Stephen Van Lare, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 343 days.

(21) Appl. No.: 16/146,634

(22) Filed: Sep. 28, 2018

(51) Int. Cl.
*G06F 16/93* (2019.01)
*G06F 16/51* (2019.01)
*G06F 16/28* (2019.01)
*G06F 16/901* (2019.01)

(52) U.S. Cl.
CPC ........... *G06F 16/93* (2019.01); *G06F 16/285* (2019.01); *G06F 16/51* (2019.01); *G06F 16/9024* (2019.01)

(58) Field of Classification Search
CPC .. G06F 16/5846; G06F 16/353; G06F 16/285; G06F 16/35; G06F 16/906
See application file for complete search history.

(56) References Cited

U.S. PATENT DOCUMENTS

| | | | |
|---|---|---|---|
| 9,069,768 B1 * | 6/2015 | Sampson | G06K 9/00463 |
| 10,657,369 B1 * | 5/2020 | Chang | G06K 9/00483 |
| 2004/0013302 A1 * | 1/2004 | Ma | G06F 16/83 |
| | | | 382/209 |
| 2013/0236111 A1 * | 9/2013 | Pintsov | G06K 9/00483 |
| | | | 382/224 |

OTHER PUBLICATIONS

Muhammad et al. "Fuzzy multilevel graph embedding", copyright 2012 Elsevier Ltd.*
Sharma et al. Determining similarity in histological images using graph-theoretic description and matching methods for content-based image retrieval in medical diagnostics, Biomed Center, copyright 2012.*
Ana et al. "A machine learning approach for Graph-based Page segmentation", Department of Exact Science,State University of Feira de Santana (UEFS) Sep. 1, 2018.*
Djamel et al. "Classification of business documents for realtime application", copyright Springer-Verlag 2011.*
Anoop et al. "Document structure and layout analysis", May 9, 2016.*

(Continued)

*Primary Examiner* — Etienne P Leroux
*Assistant Examiner* — Cindy Nguyen

(57) ABSTRACT

A computer system and computerized method that groups documents with similar image layout together. A document similarity metric based on locally connected subgraphs is employed. Region adjacency graphs are generated from word segments extracted from document images. Fuzzy attributed graph isomorphism is performed on subgraphs checking node and edge attribute similarity. Document similarity is then calculated on a normalized score between matching subgraphs of different documents. Unsupervised clustering of document layouts is performed to generate clusters of documents with similar structure.

18 Claims, 12 Drawing Sheets

(56) References Cited

OTHER PUBLICATIONS

Rosetta: Large Scale System for Text Detection and Recognition in Images, F. Borisyuk, A. Gordo, V. Sivakumar, Applied Data Science Track Paper, KDD 2018, Aug. 19-23, 2018, London, United Kingdom.

An Improved Algorithm for Matching Large Graphs, L. P. Cordella, P. Foggia, C. Sansone, M. Vento, Dipartimento di Informatica e Sistemistica Università degli Studi di Napoli "Federico II" Via Claudio, 21-80125 Napoli ITALY (2001).

Binary Codes Capable of Correcting Deletions, Insertions and Reversals, Levenshtein, V. I. Soviet Physics Doklady, vol. 10, p. 707, Feb. 1966.

A density-based algorithm for discovering clusters in large spatial databases with noise, Ester, Martin; Kriegel, Hans-Peter; Sander, Jörg; Xu, Xiaowei, Simoudis, Evangelos; Han, Jiawei; Fayyad, Usama M., eds., Proceedings of the Second International Conference on Knowledge Discovery and Data Mining (KDD-96). AAAI Press, pp. 226-231 (1996).

\* cited by examiner

| | PRICE | QTY | AMOUNT |
|---|---|---|---|
| | 376.25 | | 376.25 |
| | 156.00 | | 156.00 |
| | 15.00 | 4 | 60.00 |
| | 30.10 | 2 | 60.20 |
| | 241.87 | | 241.87 |
| | 376.00 | | 376.00 |
| | 2.80 | 16 | 44.80 |
| | 90.60 | | 90.60 |
| | 127.00 | 2 | 254.00 |
| | 74.00 | | 74.00 |
| | 280.00 | 1 | 280.00 |
| | 280.00 | 1 | 280.00 |
| | 22.55 | 4 | 90.20 |
| | 16.10 | | 16.10 |
| | 11.85 | | 11.85 |
| | 17.00 | | 17.00 |
| | 6.45 | 4 | 25.80 |
| | 95.65 | | 95.65 |
| | 320.00 | | 320.00 |
| | 852.00 | | 852.00 |
| | 34.00 | | 34.00 |
| | 98.00 | 19 | 1,862.00 |
| | 0.00 | | 0.00 |
| | 0.00 | | 0.00 |
| | 0.00 | | 0.00 |

| | |
|---|---|
| Total | USD 5,618.32 |
| Payments/Credits | USD 0.00 |
| Balance Due | USD 5,618.32 |

VISIT US ON THE WEB AND SHOP 24 HOURS A DAY AT

Please advise us within 24 hours if shipment is not as ordered.

FIG. 4A

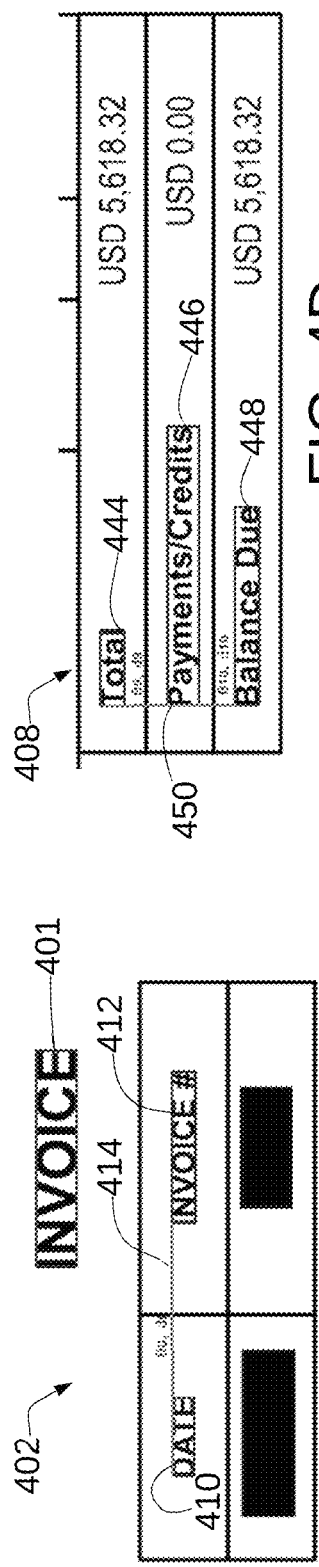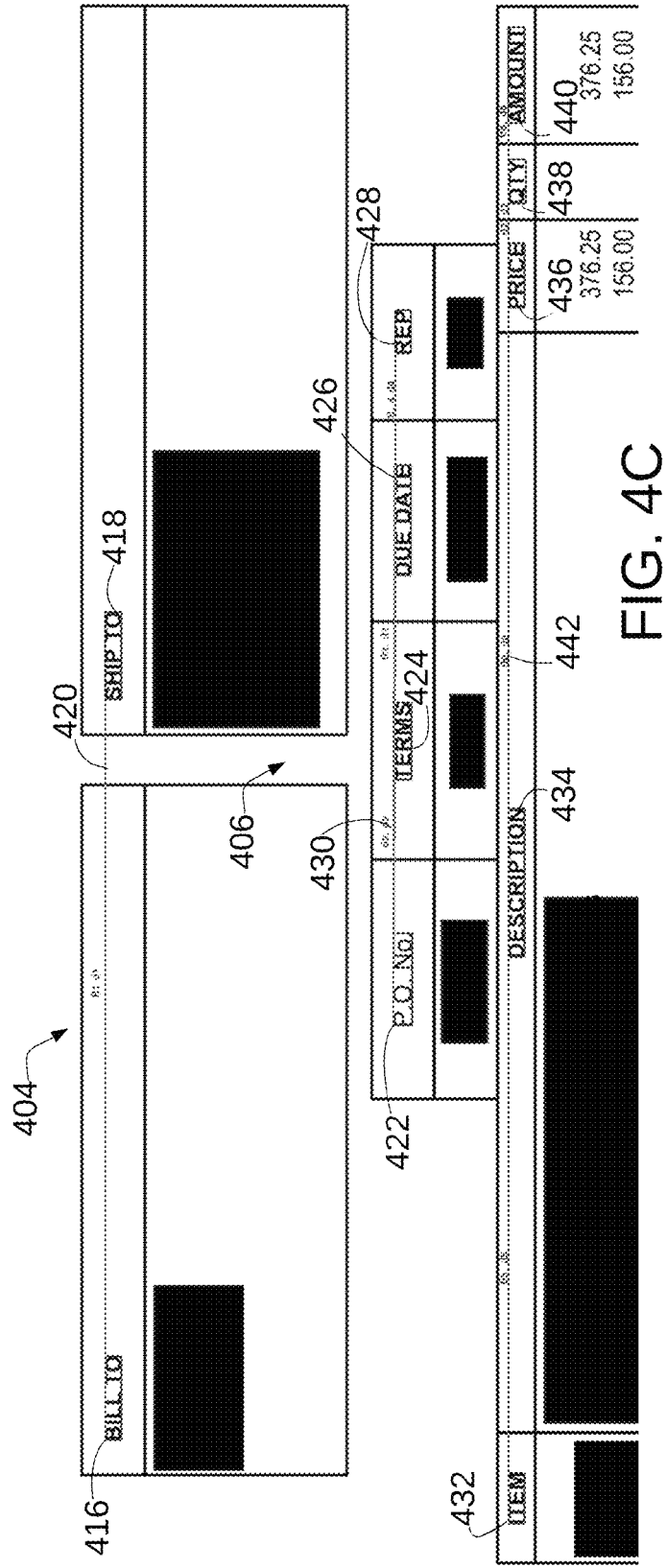

510 [TERMS:] Payable in U.S Dollars at the time of receipt unless credit has been approved in advance. [Invoices] with approved credit are due no later than 30 days from the date of invoice. Interest at the rate of 1 1/2% per month, 18% per annum, or the maximum lawful rate, whichever is less, will be charge on past due accounts.

512

568.86
                                        568.86    0.00 CR
                                                  0.00
                                        568.86    496.80
                                                  0.00 CR
                                        496.80    12.97
                                                  0.00 CR

PARTS:
PARTS COVERAGE [CREDIT] — 550
568 — TOTAL PARTS [TOTAL] — 552
SURCHARGE
LABOR:
570 — LABOR COVERAGE [CREDIT] — 554
TOTAL LABOR:
MISC.:
MISC. COVERAGE [CREDIT] — 556
TOTAL MISC.:

504

We are conforming with the Fair Labor Standards Act of 1938 as amended.
This invoice is subject to the terms and conditions of sale, including limitations on warranties, detailed on the reverse side of this form. [Customer] acknowledges the existence of the terms and conditions and confirms they have been read and fully understood.
[SHIPPING TERMS:] FOB Shipping Point unless otherwise stated.
558  560  572  562

_____  _____
      SIGNATURE                DATE
       564                     566
AUTHORIZED BY (print name)     574

FIG. 5D

REGION ADJACENT SUBGRAPH ISOMORPHISM FOR LAYOUT CLUSTERING IN DOCUMENT IMAGES

FIELD OF THE DISCLOSURE

This disclosure relates generally to the field of data processing systems and more particularly to detection and retrieval of information from digitized documents.

BACKGROUND

Accurate identification and extraction of data from business documents is an important aspect of computerized processing of business documents. Some business documents are exchanged in an electronic format that permits automatic, or semi-automatic importation of required information into a computer program for processing. A large volume of business documents however are exchanged in an image format, such as paper, or an electronic representation of an image format, such in Portable Document Format (PDF), or other image formats (TIFF, JPEG, etc.). Typically, such business documents are structured in some way to facilitate at least visual recognition of pertinent fields in the document. Automating the processing of such documents is challenging due to the variability in formatting and image quality in such documents. Typically, for a particular type of document, such as an invoice, expense report or purchase order, there will be variability the specific information contained. While any particular type of business document will have a number of fields that are necessary, and commonly found, such fields will be formatted differently among different documents and will be positioned differently on the document. Moreover, even if two documents have the same fields, in the same format, there may be visually perceptible differences (such as from scanning artifacts and different image resolutions) that can prove challenging to automated scanning and recognition systems. Accordingly, there is a need for improved computerized systems and methods for automating the recognition of business documents that are exchanged in an image format.

SUMMARY

A computerized method and system for generating groupings of documents that are in image format, where the image format has a visually perceptible geometric structure is disclosed herein. Each of the documents is processed to generate, for each of the documents, a set of word segments. One or more region adjacency graphs from the word segments is generated for each of the documents. Each region adjacency graphs comprises one or more subgraphs. A region adjacency graph for a document is generated from the word segments generated for that document. Each of the subgraphs in a region adjacency graph comprises one or more nodes, each node corresponding to a word segment, and each node is connected to at least one other node by an edge, where each edge is characterized by a distance attribute and an angle attribute. Node attribute similarity is determined between each document by performing fuzzy attributed graph isomorphism between each subgraph in each document. Document similarity, between any two of the documents, is calculated on a normalized score between matching subgraphs of the two documents, where determining whether subgraphs from any two documents match is a function of node attribute similarity. Unsupervised clustering of document layouts is performed using the calculated document similarity. This permits documents with similar layout to be grouped together, such that a template designed on one document in a group permits an extraction engine to extract all relevant fields on all documents with the group.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 3A shows another example of a domain document that has been processed to identify and link nodes.

FIGS. 3B, 3C and 3D show enlarged portions of FIG. 3A.

FIG. 4A shows another example of a domain document that has been processed to identify and link nodes.

FIGS. 4B, 4C and 4D show enlarged portions of FIG. 4A.

FIG. 5A shows another example of a domain document that has been processed to identify and link nodes.

FIGS. 5B, 5C and 5D show enlarged portions of FIG. 5A.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Converting a document image into structured data may be performed in a process comprising three major steps: (i) group documents uploaded by user(s) into groups based on the layout structure of the documents, (ii) manually design an extraction template for each unique layout, (iii) employ an extraction engine that uses the template for each layout to convert the document text into a structured format. Disclosed herein are methods and systems to perform the first step described above, namely to group documents with similar layout together, such that a template designed on one document in each group would allow an extraction engine to extract all relevant fields on all documents with each group. The documents of interest here are documents with some structure, and specifically, documents that have a similar geometric structure that permit them to be grouped together. A document similarity metric based on locally connected subgraphs is employed. Region adjacency subgraphs are built from word segments in invoice documents that have been processed by Optical Character Recognition (OCR) to identify text segments within the document. In the disclosed methods/systems, a document graph is composed of one or more of these locally connected subgraphs with OCR'd text as node attributes and distance and angle between nodes as edge attributes. Fuzzy attributed graph isomorphism is preferably performed on subgraphs checking node and edge attribute similarity. Document similarity is then calculated on a normalized score between matching subgraphs of both documents. The final metric is then used in a DBSCAN implementation to perform unsupervised clustering of document layouts. Finally, the Region Adjacent subGraphs (RAGs) may be inspected visually to understand why particular layout were grouped together. Advantageously, the disclosed methods/systems enable: (i) automatic creation of region adjacent subgraphs, (ii) grouping of known layout templates, (iii) grouping of unknown layout templates, and (iv) a visual system to explain layout grouping.

Figure 1:
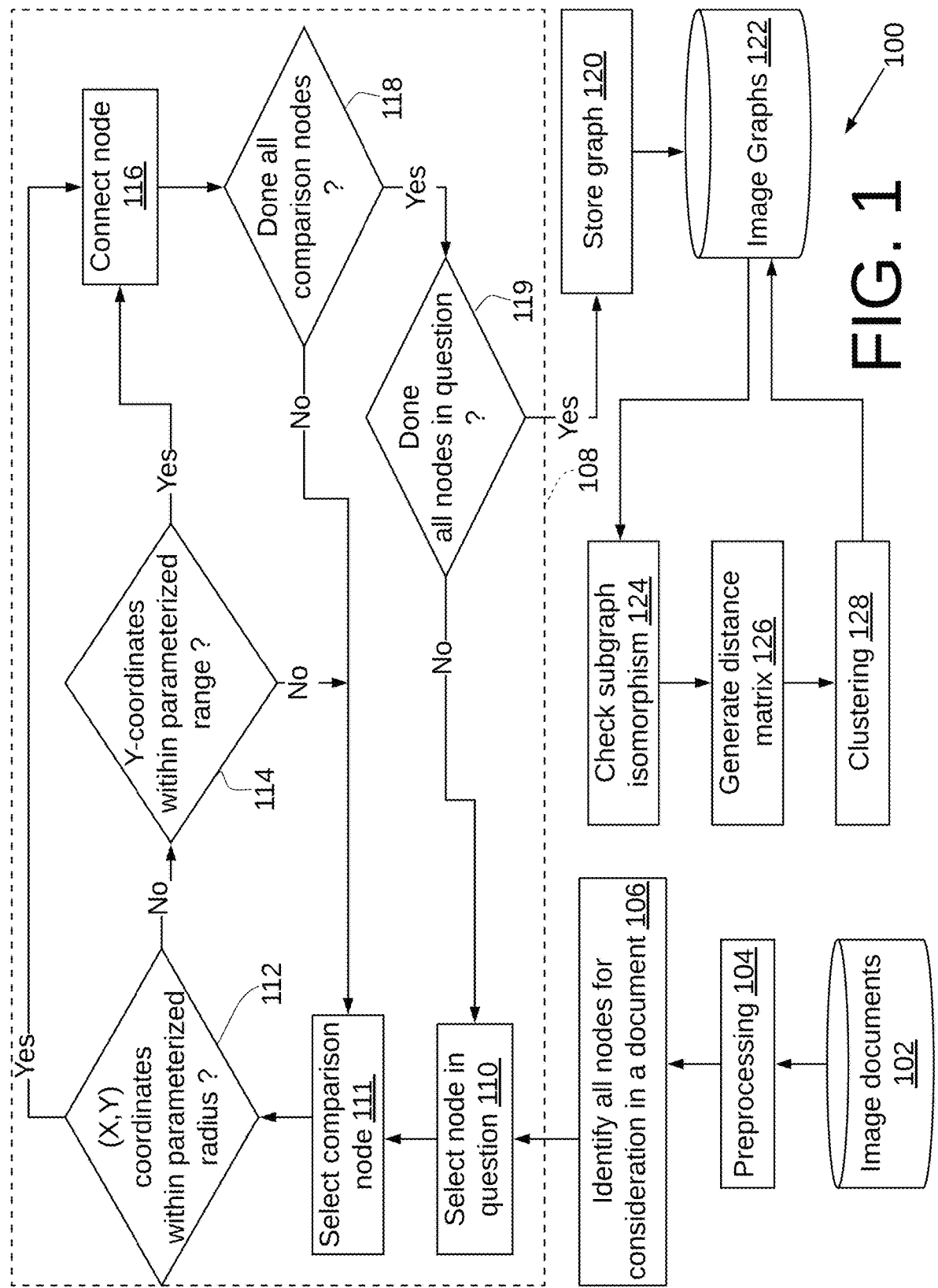
FIG. 1 is a high-level block diagram of an embodiment of a system for performing region adjacent subgraph isomorphism for layout clustering in document images.

FIG. 1 is a high-level block diagram of an embodiment of a system 100 for performing region adjacent subgraph isomorphism for layout clustering in document images. A corpus of image documents 102 may include a variety of different types of business documents, stored in at least an image format, such as PDF, JPEG, TIFF, where there are multiple instances of each type of business document. The business documents will typically be of a document type that is processed regularly by an organization, such as an invoice, purchase order, job application and travel expense report. Other business documents may be more specific to an organization's business. For example, a financial institution may use a loan application form, or a healthcare organization may use a patient intake form.

Figure 2:
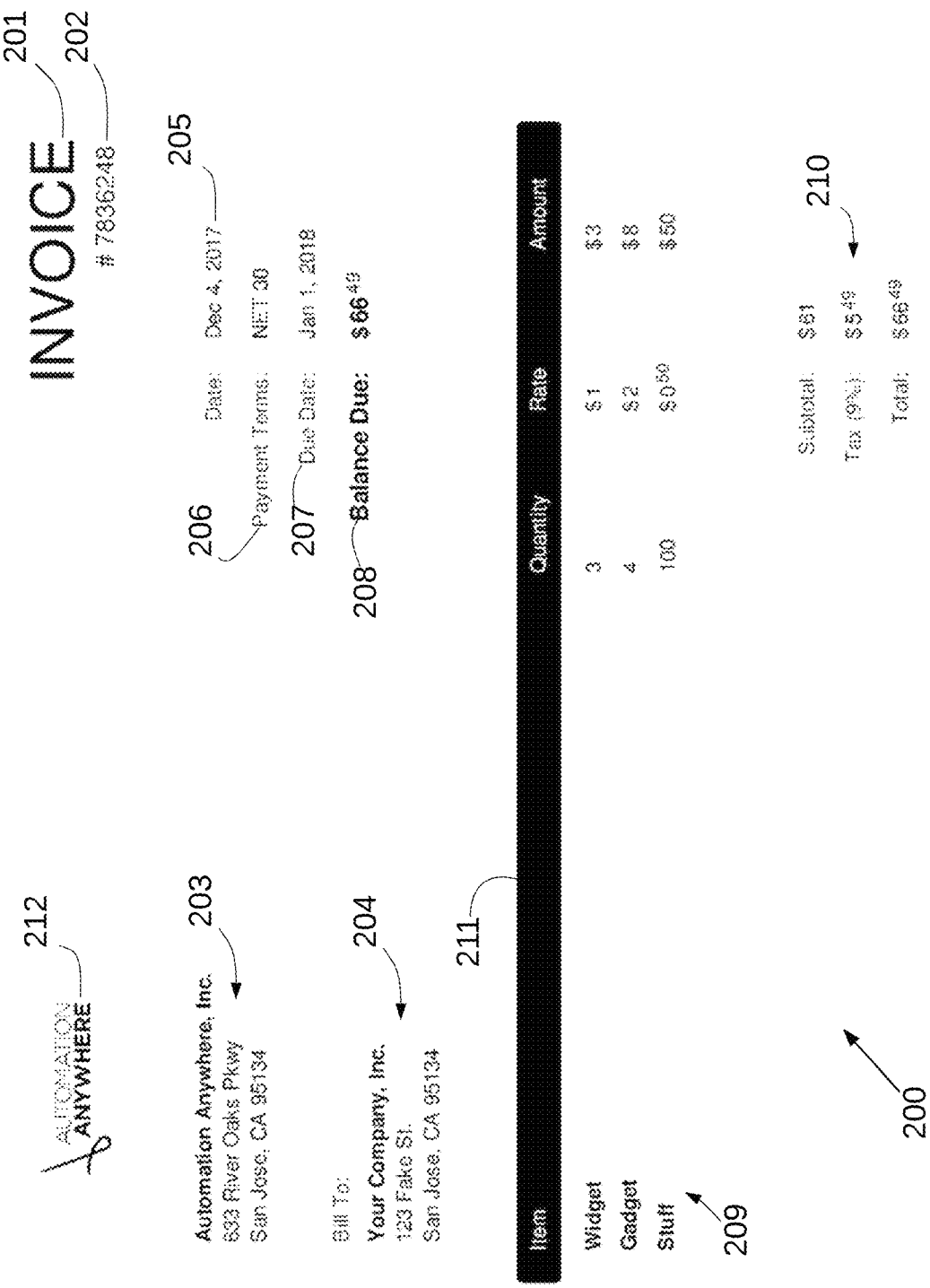
FIG. 2 shows an example of a typical domain document (English-language invoice) converted to a monochrome image.

An example of a typical domain document (English-language invoice) converted to a monochrome image, and an example of a specific instance of an image document may be seen in FIG. 2. As seen, invoice 200, which may be one of the document images 102, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein. The present specification provides an example of an invoice as a business document containing visually perceptible geometric structure. The principles described herein also apply to other types of business documents where the documents of a particular type (such as a purchase order, job application, expense report, loan application, medical record) have a similar geometric structure.

Turning back to FIG. 1, creation of a RAG for an image document is started by preprocessing at 104, the document to generate a textual representation of text represented in the image document. Each text segment identified in an image document may potentially correspond to a node. In one embodiment, nodes (e.g. date, invoice) are text segments generated by OCR that are present in some lookup dictionary of terms. That is, a text segment may be considered a node if it is also present in a list of possible node terms. In another embodiment, nodes consist of those segments identified by a machine learning system to be important keywords in a document. In such a system, a text segment is identified as a keyword, and thus a node, not only by the segment's own text but also by the text segments that surround the text segment in question.

Figure 3A:
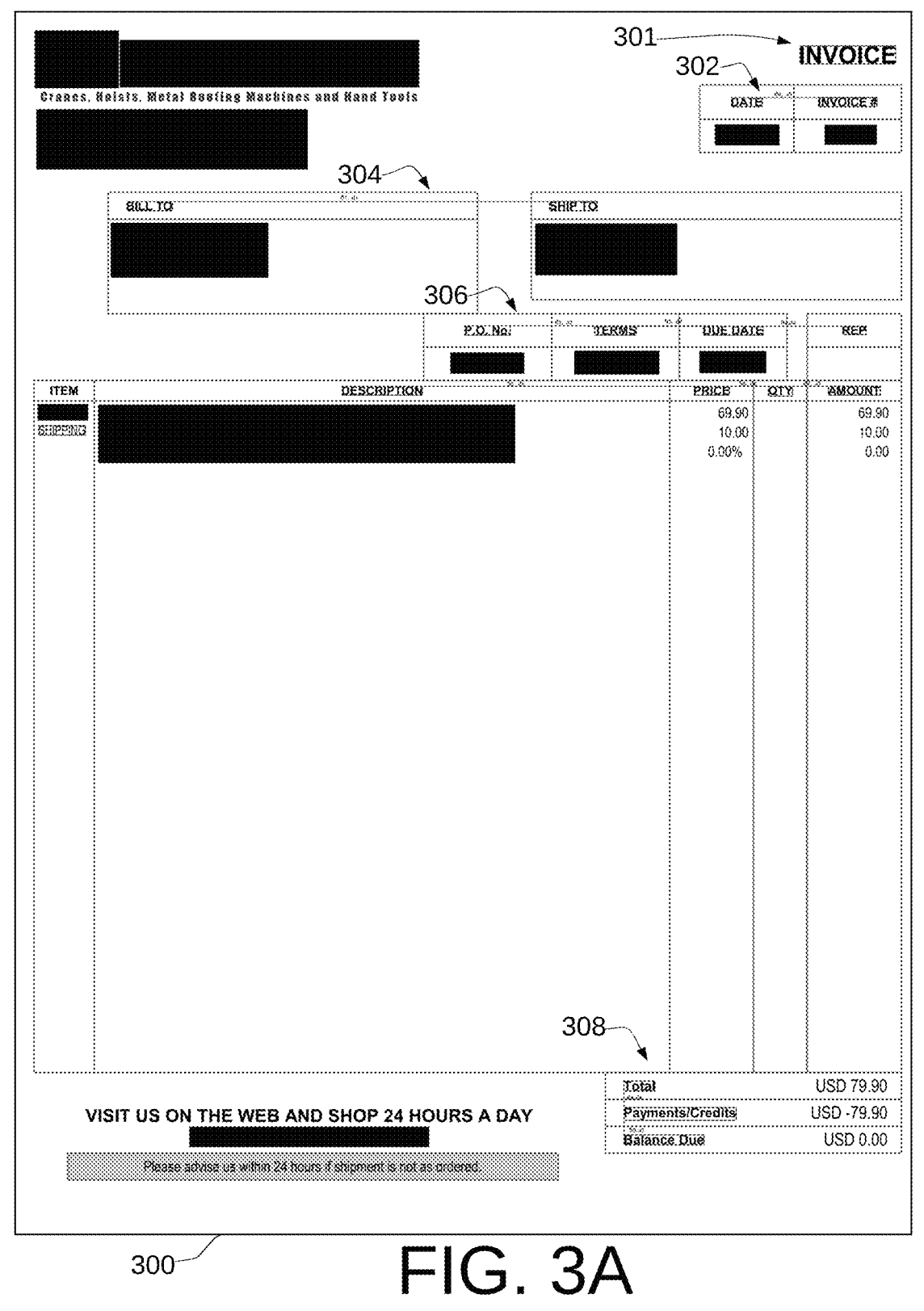
Figures 3B, 3C, 3D:
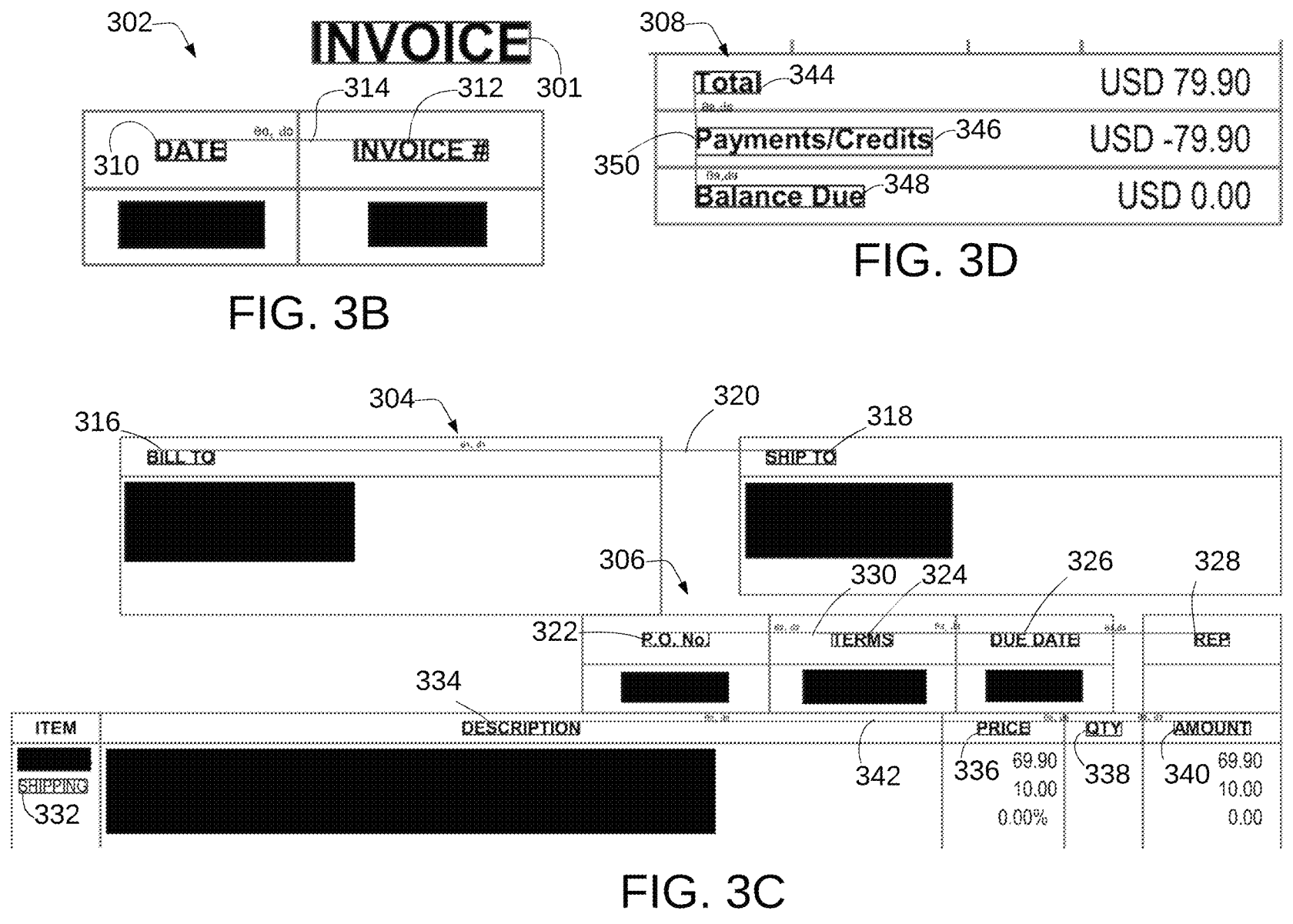
Figure 5A:
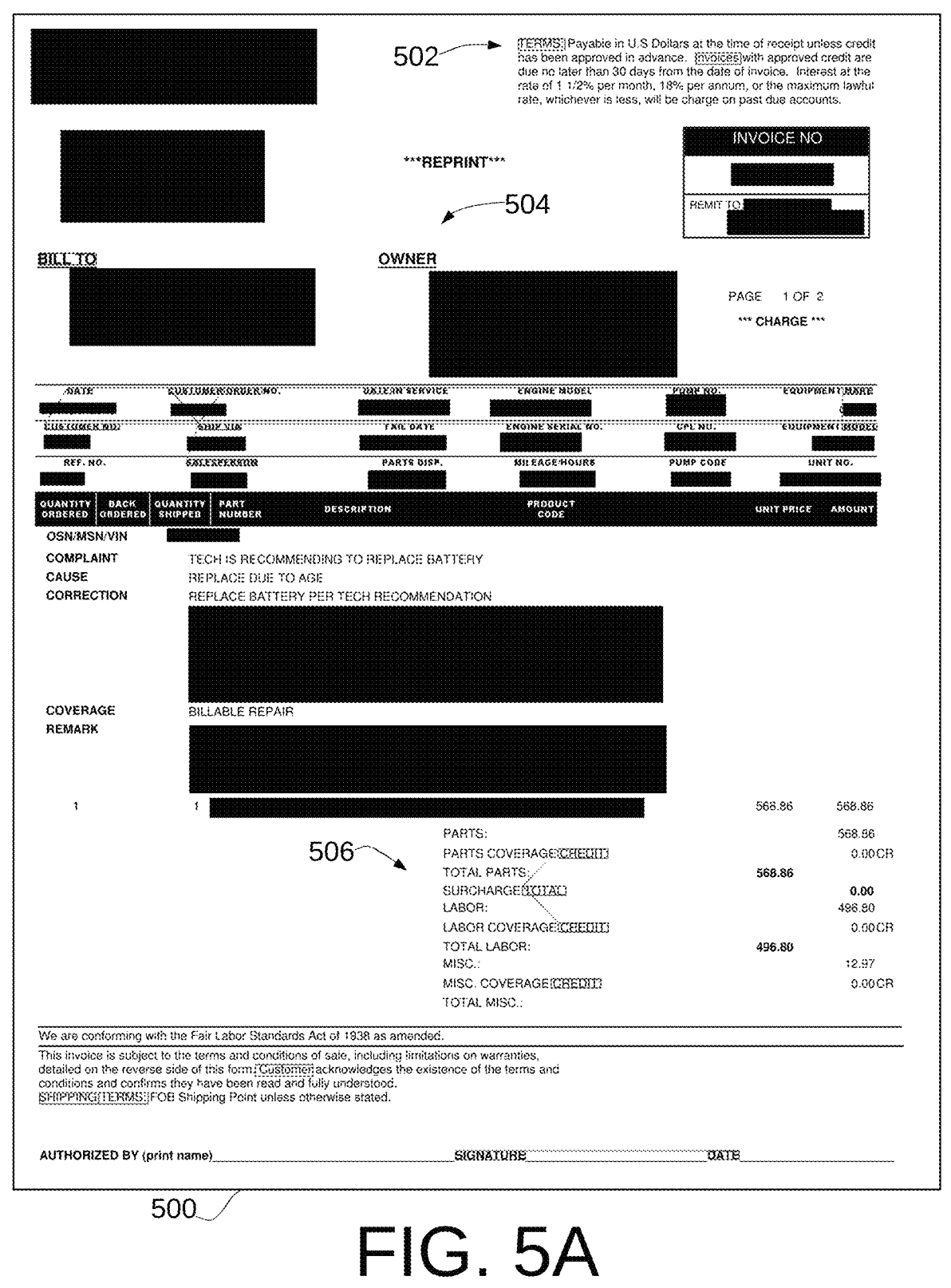
Figures 5B, 5C:
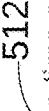

Examples of nodes in an image document may be seen in FIG. 3A and more clearly in FIGS. 3B, 3C and 3D which show enlarged portions of FIG. 3A. The invoice documents, and portions thereof, shown in FIGS. 3A-3D, 4A-4D, and 5A-5D are redacted versions of scanned actual invoices obtained from third-parties, with the black rectangles representing the redacted information. In FIG. 3A an image of an invoice document 300 is shown. A node "INVOICE" is seen at 301. Four portions of the invoice document 300 are designated at 302, 304, 306 and 308. Portion 302 may be seen enlarged in FIG. 3B. The text segments "DATE" and "INVOICE #" have each been identified as a node—310 (DATE), and 312 (INVOICE #). Other nodes may be seen in FIG. 3C which shows portions 304 and 306 with nodes identified at 316, 318, 322, 324, 326, 328, 332, 334, 336, 338 and 340. Portion 308 may be seen enlarged in FIG. 3D, where nodes 344, 346 and 348 are shown. FIG. 4A shows an image of an invoice document 400 that is similar to the invoice document 300. A node "INVOICE" is seen at 401. Four portions of the invoice document 400 are designated at 402, 404, 406 and 408. Portion 402 may be seen enlarged in FIG. 4B. The text segments "DATE" and "INVOICE #" have each been identified as a node—410 (DATE), and 412 (INVOICE #). Other nodes may be seen in FIG. 4C which shows portions 404 and 406 with nodes identified at 416, 418, 422, 424, 426, 428, 432, 434, 436, 438 and 440. Portion 408 may be seen enlarged in FIG. 4D, where nodes 444, 446 and 448 are shown. FIG. 5A shows an image of an invoice document 500 that is formatted differently than the invoice documents 300 and 400. Three portions of the invoice document 500 are designated at 502, 504 and 506. Portion 502 may be seen enlarged in FIG. 5B. The text segments "TERMS" and "Invoices" have each been identified as a node—510 (DATE), and 512 (Invoices). Other nodes may be seen in FIG. 5C which shows portions 504 with nodes identified at 514, 516, 517, 518, 519, 520, 522, 524, 526 and 528. Portion 504 may be seen enlarged in FIG. 5D, where nodes 550, 552, 554, 556, 558, 560, 562, 564 and 566 are shown.

Figure 6:
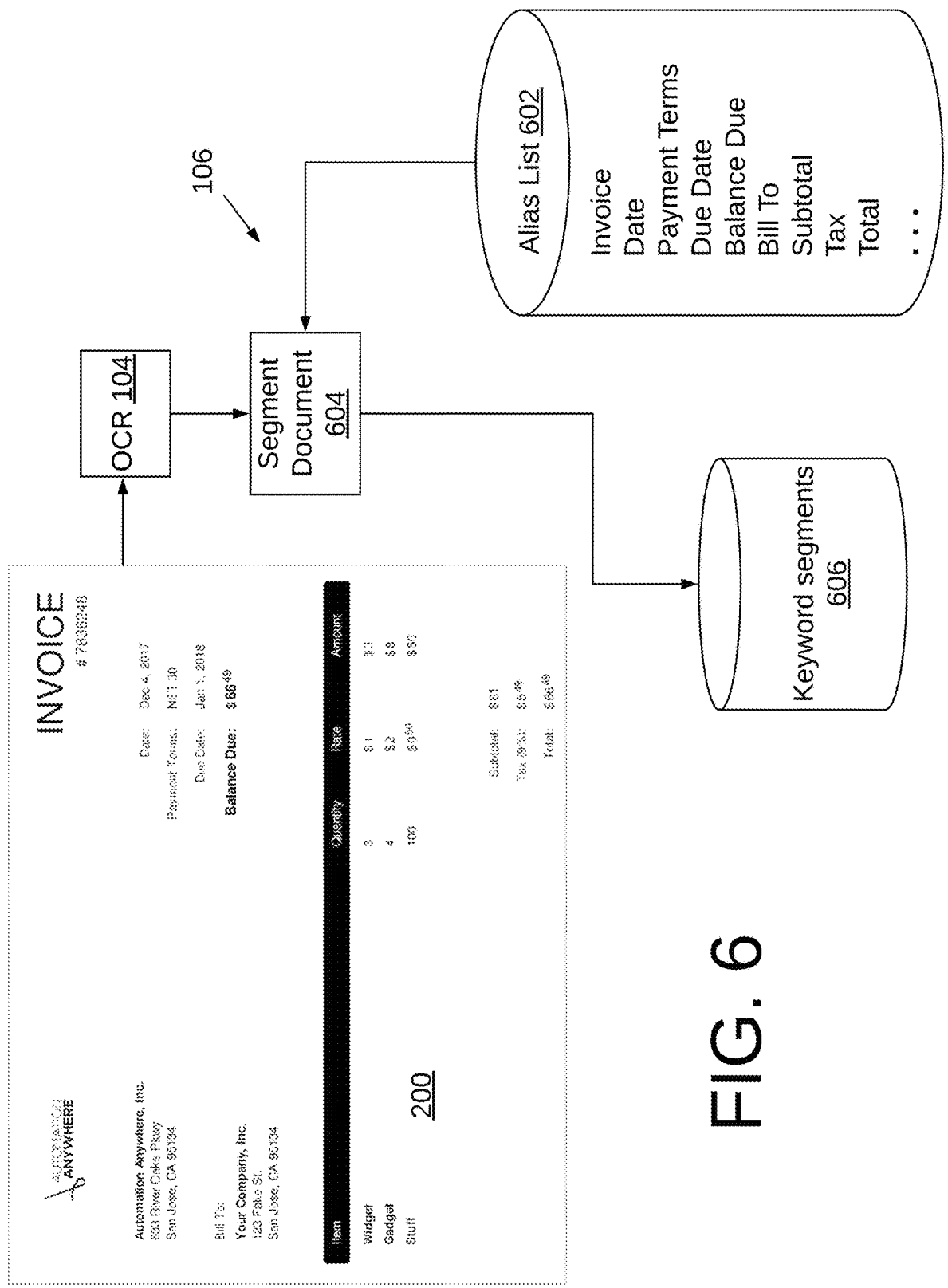
FIG. 6 illustrates further details of module 106 of FIG. 1.

Turning back to FIG. 1, at 106, nodes for consideration in a document are identified. This is shown in further detail in FIG. 6. Not every node is a candidate for a subgraph. Only some words are important, e.g. words that are desired to be extracted. In the embodiment shown in FIG. 6, only keyword segments according to an alias list 602 are considered as keywords in invoice documents. The alias list 602 is populated with text strings of interest for processing of one or more particular document type(s). For example, as seen, the alias list 602 includes, by way of example, the following text strings that match to fields commonly found in invoices: Invoice, Date, Payment Terms, Due Date, Balance Due, Bill To, Subtotal, Tax, and Total. The image document 200 is preprocessed at 104 as explained above. The identified text segments are then processed at 604 by a string similarity comparison with all terms in the Alias List 602. In one embodiment, a normalized Levenshtein distance is used by dividing the Levenshtein by the maximum number of characters in either of the two comparison string as described in Binary Codes Capable of Correcting Deletions, Insertions and Reversals, Levenshtein, V. I. Soviet Physics Doklady, Vol. 10, p. 707, February 1966 (LINK HERE: http://adsabs.harvard.edu/abs/1966SPhD . . . 10 . . . 707L) The keyword segments 606 is shown separately from alias list 602. This is purely for simplicity of explanation. The keyword segments and alias list may be stored in the same storage system or may be stored separately.

Turning back to FIG. 1, after all nodes are identified in the document image 200, nodes are connected at 108 via attributed edges. In this operation, the positional relationship of each node in document image 200 is compared to the positional relationship of each other node in the document. Nodes are only connected if they meet the following conditions: they are within a parameterized radius of another node or they exist with y-coordinates that differ by a parameterized range. That is, segments that are near each other or on the same horizontal line are connected. In certain embodiments, connections are represented as distance in pixels between top left corners of segmentation rectangles of connected nodes and angle in degrees between the top left corners of segmentation rectangles of connected nodes. Connections between nodes may be seen in FIGS. 3B-3D, 4B-4D, and 5B-5D. As seen in FIG. 3B, nodes 310 and 312 are connected by horizontal connection 314. In FIG. 3C, nodes 316 and 318 are connected by horizontal connection 320. Nodes 322, 324, 326 and 328 are connected by horizontal connection 330. Horizontal connection 330 is denoted with a single reference number for simplicity of illustration but represents the individual connections between the adjacent nodes. Nodes 334, 336, 338 and 340 are connected by horizontal connection 342. Node 332 is not connected to any other node. In FIG. 3D, nodes 344, 346 and 348 are connected to each other by radial connection 350. Radial connection 350 is denoted with a single reference number for simplicity of illustration but represents the individual connections between the adjacent nodes. As seen in FIG. 4B, nodes 410 and 412 are connected by horizontal connection 414. In FIG. 4C, nodes 416 and 418 are connected by horizontal connection 420. Nodes 422, 424, 426 and 428 are connected by horizontal connection 430. Horizontal connection 430 is denoted with a single reference number for simplicity of illustration but represents the individual connections between the adjacent nodes. Nodes 432, 434, 436, 438 and 440 are connected by horizontal connection 442. In FIG. 4D, nodes 444, 446 and 448 are connected to each other by radial connection 450. Radial connection 450 is denoted with a single reference number for simplicity of illustration but represents the individual connections between the adjacent nodes. FIG. 5C illustrates radial connections that are not purely vertical. In FIG. 5C, nodes 516 and 522 are connected by radial connection 532. As seen, node 522 is offset horizontally and vertically from node 516 but is connected to 516 as it falls within the parameterized radial range of 516. A node may be connected to multiple nodes, as seen by radial connections 534 and 536 which connect node 524 to nodes 517 and 518 respectively. Elsewhere in FIG. 5C, horizontal connection 530 connects nodes 516, 517, 518 and 520. Horizontal connection 530 is denoted with a single reference number for simplicity of illustration but represents the individual connections between the adjacent nodes. Horizontal connection 540 connects nodes 522, 524, and 526. Horizontal connections 530 and 540 are each denoted with a single reference number for simplicity of illustration, but each represent the individual connections between adjacent nodes. Radial connection 542 connects nodes 524 and 528, and radial connection 538 connects nodes 520 and 526. Node 514 does not match the parameterized radial or horizontal criteria of tests 112 or 114 and is therefore not connected to any other node. This is also the case with nodes 510 and 512 of FIG. 5B. The horizontal line connection helps connect structures like table headers, such as seen in FIG. 3B where horizontal connection 320 connects nodes 316 (Bill To) and 318 (Ship To) which each represent table headers. The radius connection helps create unconnected subgraphs within the document by limiting the maximum distance by which two nodes can be connected This is helpful because groups of extractable components can move relative to other extractable groups within layout groups, especially regions that occur below tables. By creating subgraphs from these extractable groups, we are able to more closely model the true nature of a layout group.

At 110 a node in question is selected and compared against each other node in the document in the loop consisting of operations 111, 112, 114, 116, 118 and 119. At 112, the positional relationship of the node in question (its X, Y coordinates) is compared to the positional relationship of a selected comparison node to determine whether the two nodes are within a predetermined (parameterized) radius of each other. If so, the node in question is connected to the selected comparison node at 116. If the comparison at 112 fails, then a comparison of the positional relationship between the node in question and the selected comparison node in the vertical (Y) dimension is performed at 114. The comparison of the Y coordinates at 114 permits variance within a predetermined (parametrized) range. If the Y coordinate of the node in question is within the parameterized range of the selected comparison node then the nodes are connected at 116, and the test at 118 is performed to determine if all comparison nodes have been tested. If the test at 114 fails, then the node in question is not connected to the comparison node and a test is performed at 118 to determine if all comparison nodes have been tested. If not, another comparison node is selected at 111. Once all comparison nodes have been tested, at 119 a test is determined if all nodes in the document have been tested, i.e. all nodes in question. If not, then another node in question is selected at 110. If so, then the connections, which form a graph, are stored at 120 to image graph storage 122. The image graph storage 122 is shown separately from image documents 102. This is purely for simplicity of explanation. The image graphs and image documents may be stored in the same storage system or may be stored separately, but in either event an image graph has identifying information that permits it to be linked to its corresponding document.

Figure 7:
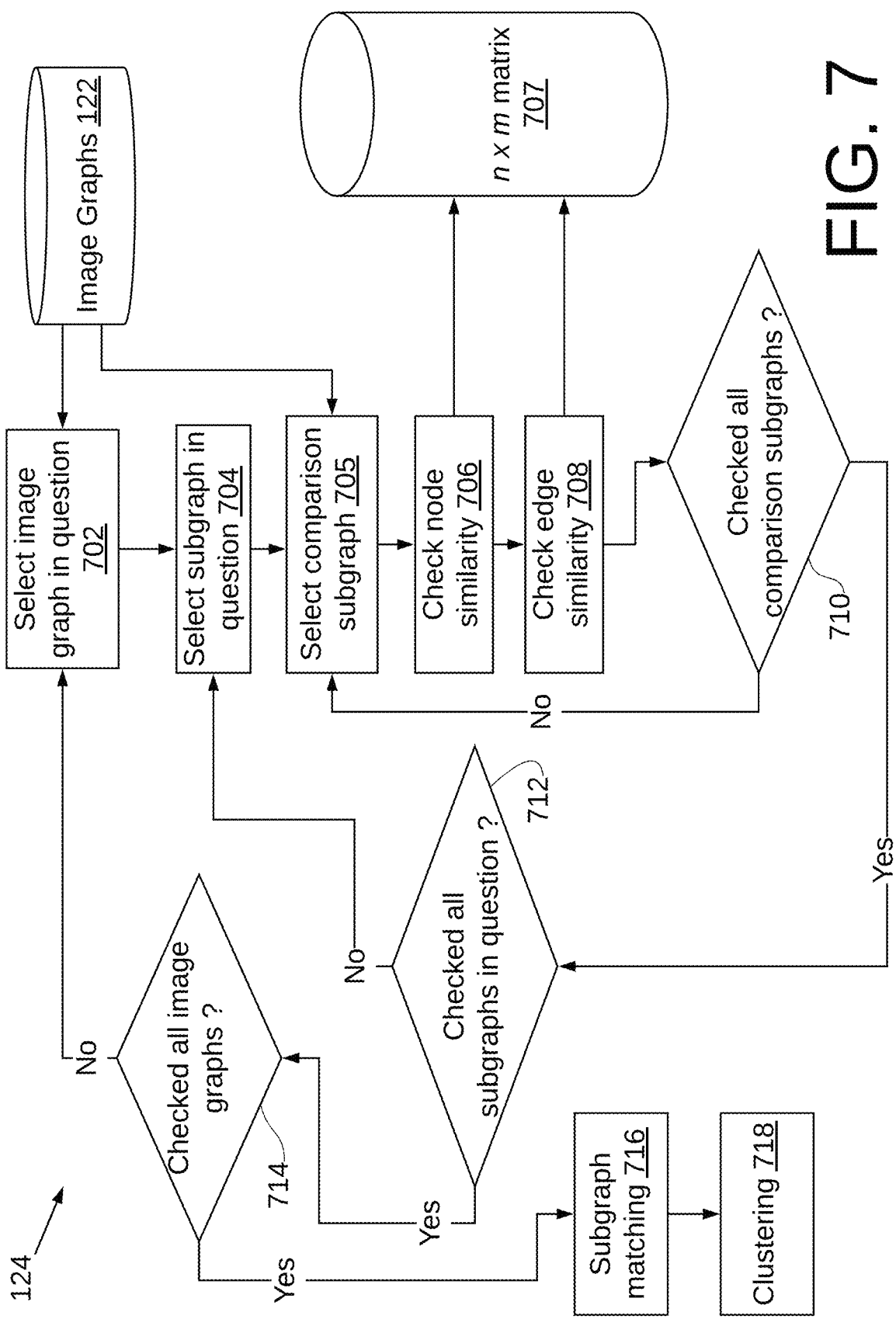
FIG. 7 illustrates further details of an embodiment of subgraph isomorphism.

As noted above, the connected nodes form subgraphs for a document and the subgraphs for a document (collectively, the subgraphs for a document form an image graph for the document) may be compared with subgraphs for another document to determine level of similarity between the documents to permit grouping together of similar documents. The term "subgraph isomorphism" refers to two subgraphs that have the same structure, i.e. the nodes and edges in two graphs are the same, within some tolerance. This test is performed at 124 where subgraph isomorphism is performed by comparing each subgraph in each document with each subgraph in each other document in a manner shown in detail in FIG. 7. In one embodiment, subgraphs with only 1 node are not considered when matching subgraphs between document image graphs. At 702 an image graph in question is selected and retrieved from image graph storage 122 and the remaining actions in FIG. 7 are performed for each image graph in image graph storage 122. At 704, a subgraph from within the image graph is selected. At 705 a comparison subgraph from another image graph is selected and retrieved from image graph storage 122. In one embodiment, subgraph isomorphism is checked on each of the subgraphs against each other using the VF2 algorithm, described in *An Improved Algorithm for Matching Large Graphs*, L. P. Cordella, P. Foggia, C. Sansome, M. Vento, 3rd IAPR-TC15 Workshop on Graph-based Representations in Pattern Recognition, Cuen, 2001, pp. 149-159. VF2 takes two parameters, a node matching function and an edge matching function. At 706, node similarity matching is performed, by determining similarity of the text in each node in the image graph in question with each node in the comparison image graph. This is performed by determining how many characters in the two nodes are different and normalizing by the mean length of the two strings. Node similarity is preferably checked based on a parameterized normalized string edit distance between text segments. Strings are always compared after conversion to lowercase. The results are stored in storage 707 in the form of an n×m matrix where n is the number of subgraphs in the image graph in question and m is the number of subgraphs in the comparison image graph. The image graphs 122 is shown separately from n×m matrix 707. This is purely for simplicity of explanation. The image graphs and n×m matrix may be stored in the same storage system or may be stored separately.

At 708, edge similarity is checked by comparing the angle attributes, which must be within a parameterized tolerance, and distance attributes which also must within a parameterized tolerance. The results are stored to the n×m matrix 707. The test at 710 is performed to determine if all subgraphs have been compared and if not, another comparison image subgraph is chosen at 704 and steps 705, 706, 708, 710 are repeated until the subgraph in question has been compared to all other subgraphs (from all other image graphs). Once all other comparison subgraphs have been compared to the subgraph in question (710), another subgraph in question is selected (712, 704) and steps 705, 706, 708, 710 are repeated until the subgraph in question has been compared to all other subgraphs (from all other image graphs). This is repeated for all subgraphs in the image graph in question. Another image graph in question is selected at 702 and the above-described operations repeated until all image graphs in the image graph storage 122 have been processed (714).

The matrix 707 is then processed at 716 to match each subgraph in each graph with at most one other subgraph in another graph. In one embodiment this may be implemented employing minimum weight matching in bipartite graphs, also known as the linear sum assignment problem. In this operation, a problem instance is described by a matrix C, where each C[i,j] is the cost of matching vertex i of the first partite set (a "worker") and vertex j of the second set (a "job"). The goal is to find a complete assignment of workers to jobs of minimal cost. Let X be a Boolean matrix where X[i,j]=1, if and only if row i is assigned to column j. Then the optimal assignment has cost:

$$\min \sum_i \sum_j C_{i,j} X_{i,j}$$

such that each row is assigned to at most one column, and each column to at most one row. The total number of matches between one image graph and another graph is then determined. This score is then normalized by the difference between graph sizes such that this distance score lies in the range between zero and one where one is the furthest away possible, no subgraphs match, and zero indicates an exact match.

Next clustering is performed at 718 to assign image graphs into clusters. In one embodiment the clustering is performed using a data clustering technique known as Density-Based Spatial Clustering of Applications with Noise (DBSCAN), as described by Ester, Martin; Kriegel, Hans-Peter; Sander, Jörg; Xu, Xiaowei (1996). Simoudis, Evangelos; Han, Jiawei; Fayyad, Usama M., eds., *A density-based algorithm for discovering clusters in large spatial databases with noise*. Proceedings of the Second International Conference on Knowledge Discovery and Data Mining (KDD-96). AAAI Press. pp. 226-231. The symmetric precomputed distance matrix computed between all documents using the distance metric in step 716 is given to a DBSCAN implementation for assignment into clusters. To optimize clustering, a grid search over all 8 parameters governing building the RAGs and subgraph matching is performed. The 8 parameters are: 1. Radius when adding nodes from 112, 2. Y coordinate difference range from 114, 3. String edit distance to see if node exists in dictionary from 106, 4. Edge matching distance tolerance from 708, 5. Edge matching angle tolerance from 708, 6. Node matching string edit distance from 706, 7. The maximum similarity distance between two samples for them to be considered as in the same neighborhood from DBSCAN in 718, 8. The number of samples (or total weight) in a neighborhood for a point to be considered as a core point in DBSCAN from 718.

An example of the matching can be seen by examining the invoices in FIGS. 3A and 4A which are highly similar. Turning to FIGS. 3B, 3C, 3D and 4B, 4C, 4D, there are four isomorphic subgraphs between image 300 from FIG. 3A and image 400 from FIG. 4A. The subgraph indicated by connector 314 matches the subgraph indicated by connector 414. The subgraph indicated by connector 320 matches the subgraph indicated by connector 420. The subgraph indicated by connector 330 matches the subgraph indicated by connector 430. And, the subgraph indicated by connector 350 matches the subgraph indicated by connector 450. Notably, the subgraph indicated by connector 342 is not isomorphic to the subgraph indicated by connector 442. The reason these subgraphs differ is due to an error in the OCR/segmentation where the term "ITEM" was not identified in image 300 in FIG. 3A (seen enlarged in FIG. 3C in the vicinity of reference number 332). The total distance between images 300 and 400 can be calculated based on the number of matching subgraphs. The below formula may be employed:

Normalized distance between document graphs $$A \ \& \ B = 1 - \frac{(t + x - n)}{x}$$

Where,
t=total number of isomorphic subgraphs between A and B
x=maximum number of subgraphs on either A or B
n=minimum number of subgraphs on either A or B
In this case:
Normalized distance between document graphs $$A \ \& \ B = 1 - \frac{(4 + 5 - 5)}{5} = 0.2$$

The above is one example of normalizing a score. Other variants may also be employed.

Figure 8:
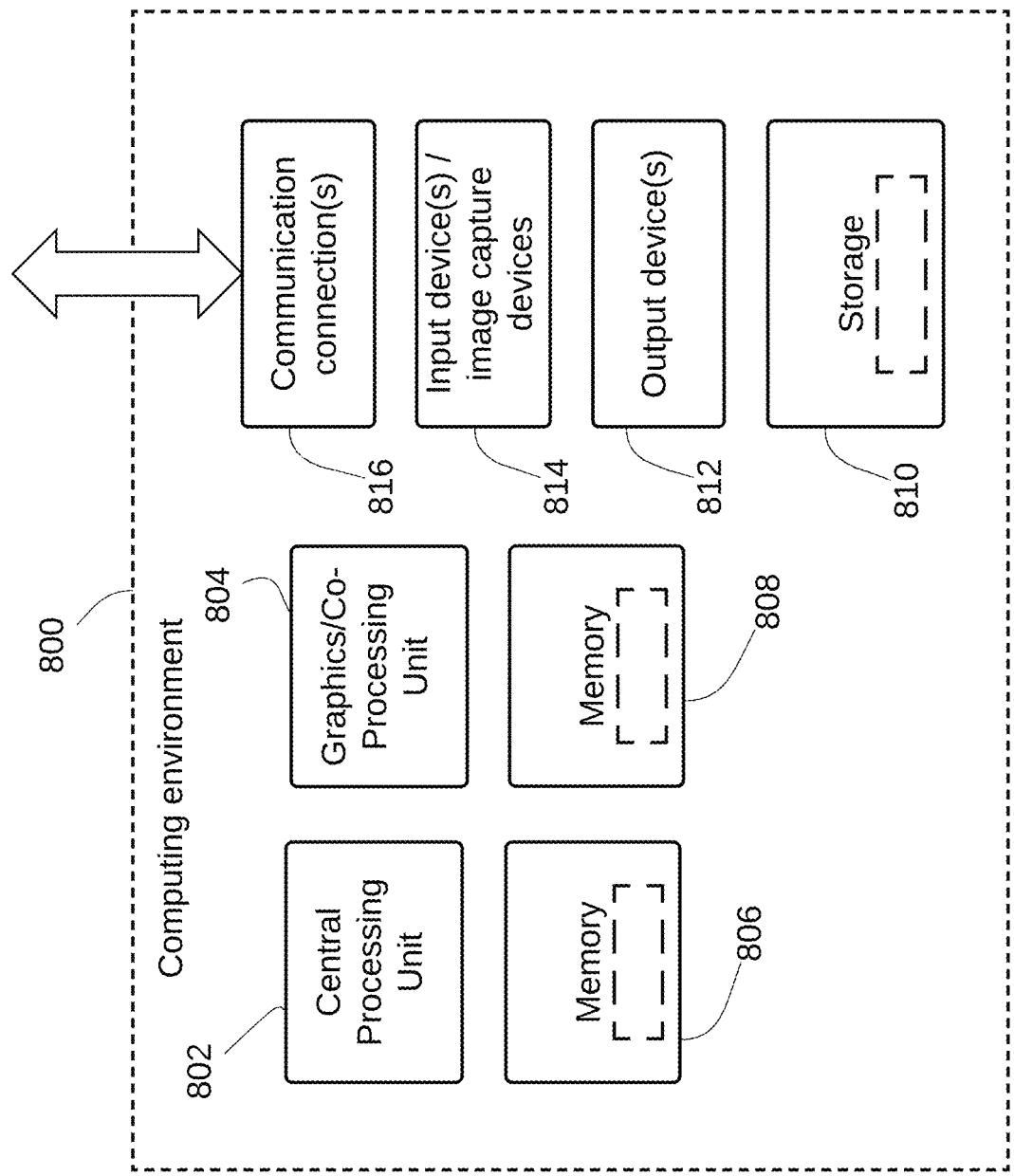
FIG. 8 illustrates a block diagram of hardware that may be employed in an implementation of the system 100.

FIG. 8 depicts a generalized example of a suitable general-purpose computing system 800 in which the described innovations may be implemented in order to improve the processing speed and efficiency with which the computing system 800 operates to perform the functions disclosed herein. With reference to FIG. 8 the computing system 800 includes one or more processing units 802, 804 and memory 806, 808. The processing units 802, 806 execute computer-executable instructions. A processing unit can be a general-purpose central processing unit (CPU), processor in an application-specific integrated circuit (ASIC) or any other type of processor. The tangible memory 806, 808 may be volatile memory (e.g., registers, cache, RAM), non-volatile memory (e.g., ROM, EEPROM, flash memory, etc.), or some combination of the two, accessible by the processing unit(s). The hardware components in FIG. 8 may be standard hardware components, or alternatively, some embodiments may employ specialized hardware components to further increase the operating efficiency and speed with which the system 100 operates.

Computing system 800 may have additional features such as for example, storage 810, one or more input devices 814, one or more output devices 812, and one or more communication connections 816. An interconnection mechanism (not shown) such as a bus, controller, or network interconnects the components of the computing system 800. Typically, operating system software (not shown) provides an operating system for other software executing in the computing system 800, and coordinates activities of the components of the computing system 800.

The tangible storage 810 may be removable or non-removable, and includes magnetic disks, magnetic tapes or cassettes, CD-ROMs, DVDs, or any other medium which can be used to store information in a non-transitory way and which can be accessed within the computing system 800. The storage 810 stores instructions for the software implementing one or more innovations described herein.

The input device(s) 814 may be a touch input device such as a keyboard, mouse, pen, or trackball, a voice input device, a scanning device, or another device that provides input to the computing system 800. For video encoding, the input device(s) 814 may be a camera, video card, TV tuner card, or similar device that accepts video input in analog or digital form, or a CD-ROM or CD-RW that reads video samples into the computing system 800. The output device(s) 812 may be a display, printer, speaker, CD-writer, or another device that provides output from the computing system 800.

The communication connection(s) 816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for generating groupings of documents that are in image format, where the image format has a visually perceptible geometric structure, the method comprising:
  processing each of the documents, by optical character recognition, to generate, for each of the documents, a set of word segments in a text format;
  generating for each of the documents, a region adjacency graph, comprising one or more subgraphs, from the word segments generated for the corresponding document, wherein, each of the subgraphs comprises one or more nodes, each node corresponding to a word segment, each node connected to at least one other node by an edge, each edge characterized by a distance attribute and an angle attribute;
  determining node attribute similarity between each document by performing fuzzy attributed graph isomorphism between each subgraph in each document;
  calculating document similarity, between any two of the documents, on a normalized score between matching subgraphs of the two documents, where determining whether subgraphs from any two documents match is a function of node attribute similarity; and
  performing unsupervised clustering of document layouts using the calculated document similarity, wherein the processing each of the documents to generate, for each of the documents, a set of word segments comprises:

processing each document to generate a textual representation of a plurality of keyword segments represented in the document;

comparing each of the keyword segments represented in the document against an alias list, the alias list comprising text strings of interest for processing of one or more particular document types; and adding, to the set of word segments that are to be considered when generating the corresponding region adjacency graph for the corresponding document, only those of the keyword segments that match an entry in the alias list, and wherein, documents with similar layout may be grouped together, such that a template designed on one document in a group permits an extraction engine to extract all relevant fields on all documents within the group.

2. The computerized method of claim 1 wherein generating for each of the documents, a region adjacency graph, comprising one or more subgraphs, from the word segments generated for the corresponding document, wherein, each of the subgraphs comprises one or more nodes, each node corresponding to a word segment, each node in a subgraph connected to at least one other node by an edge, each edge characterized by a distance attribute and an angle attribute, comprises:

assigning each keyword segment in the set of word segments to a node, wherein each of the nodes has associated therewith a position corresponding to a two-dimensional position of a corresponding keyword segment in the corresponding document;

comparing position of each node in the region adjacency graph with a position of each other node in the region adjacency graph; and connecting a first node to a second node if the second node has a position within a parameterized radius of the first node or if the first node and the second node have y-coordinates that differ within a parameterized range, wherein a set of connected nodes in a region adjacency graph for a document comprises a subgraph within the region adjacency graph.

3. The computerized method of claim 2 wherein each node has associated therewith a segmentation rectangle that encompasses a word segment corresponding to the node, and wherein a connection between the first node and the second node is represented as distance in pixels between top left corners of segmentation rectangles corresponding to the first node and the second node, and angle in degrees between the top left corners of the segmentation rectangles corresponding to the first node and the second node.

4. The computerized method of claim 1 wherein determining node attribute similarity between each document by performing fuzzy attributed graph isomorphism between each subgraph in each document comprises:

comparing each subgraph in each document with each subgraph in each of the other documents.

5. The computerized method of claim 4 wherein comparing each subgraph in each document with each subgraph in each of the other documents comprises:

employing a node matching function to match each node in each subgraph in each document with each node in each subgraph of each of the other documents; and employing an edge matching function to match each edge in each subgraph in each document with each edge in each subgraph in each of the other documents.

6. The computerized method of claim 5 wherein employing a node matching function to match each node in each subgraph in each document with each node in each subgraph of each of the other documents comprises:

determining similarity of text between a selected first node and a selected second node by determining how many characters in the selected first node and the selected second node nodes are different and normalizing by the mean length of the text strings represented by the selected first node and the selected second node.

7. The computerized method of claim 6 wherein determining similarity of text between a selected first node and a selected second node is performed after converting text in the first node and the second node to lower case characters.

8. The computerized method of claim 5 wherein employing an edge matching function to match each edge in each subgraph in each document with each edge in each subgraph of each of the other documents comprises:

determining similarity of a first edge in a first subgraph with a second edge in a second subgraph by determining whether angle attributes of the first edge and the second edge are within a parameterized edge tolerance, and whether distance attributes of the first edge and the second edge are within a parameterized distance tolerance.

9. The computerized method of claim 4 further comprising storing results of the fuzzy attributed graph isomorphism in an n×m matrix where n is the number of subgraphs in any first selected region adjacency graph image graph and m is the number of subgraphs in any region adjacency graph selected for comparison with the first selected region adjacency graph.

10. The computerized method of claim 1 wherein calculating document similarity, between any two of the documents, on a normalized score between matching subgraphs of the two documents, where determining whether subgraphs from any two documents match is a function of node attribute similarity, comprises:

matching each subgraph in each region adjacency graph with at most one other subgraph in another region adjacency graph.

11. The computerized method of claim 1 wherein performing unsupervised clustering of document layouts using the calculated document similarity is performed employing density based spatial clustering of applications with noise employing a plurality of parameters employed in generating the region adjacency graphs and in matching subgraphs.

12. The computerized method of claim 11 wherein the plurality of parameters employed in generating the region adjacency graphs and in matching subgraphs comprises: parameterized radius distance for connecting nodes, parameterized y-coordinate distance for connecting nodes, string edit distance employed in determining if a node exists in a dictionary, edge matching distance tolerance between nodes, edge matching angle tolerance between nodes, string edit distance between nodes, maximum similarity distance between nodes, and number of samples in a neighborhood for a node to be considered as a core node.

13. A document processing system comprising:

data storage for storing documents that are in image format, where the image format has a visually perceptible geometric structure; and a processor operatively coupled to the data storage and configured to execute instructions that when executed cause the processor to generate groupings of the documents based on similarities in visually perceptible geometric structure by:
  processing each of the documents to generate, by optical character recognition, for each of the documents, a set of word segments;
  generating for each of the documents, a region adjacency graph, comprising one or more subgraphs, from the word segments generated for the corresponding document, wherein, each of the subgraphs comprises one or more nodes, each node corresponding to a word segment, each node connected to at least one other node by an edge, each edge characterized by a distance attribute and an angle attribute;
  determining node attribute similarity between each document by performing fuzzy attributed graph isomorphism between each subgraph in each document;
  calculating document similarity, between any two of the documents, on a normalized score between matching subgraphs of the two documents, where determining whether subgraphs from any two documents match is a function of node attribute similarity; and
  performing unsupervised clustering of document layouts using the calculated document similarity,
  wherein the processing each of the documents to generate, for each of the documents, a set of word segments comprises:
    processing each document to generate a textual representation of a plurality of keyword segments represented in the document;
    comparing each of the keyword segments represented in the document against an alias list, the alias list comprising text strings of interest for processing of one or more particular document types; and
    adding, to the set of word segments that are to be considered when generating the corresponding region adjacency graph for the corresponding document, only those of the keyword segments that match an entry in the alias list.

14. A document processing system of claim 13 wherein generating for each of the documents, a region adjacency graph, comprising one or more subgraphs, from the word segments generated for the corresponding document, wherein, each of the subgraphs comprises one or more nodes, each node corresponding to a word segment, each node in a subgraph connected to at least one other node by an edge, each edge characterized by a distance attribute and an angle attribute, comprises:
  assigning each keyword segment in the set of word segments to a node, wherein each of the nodes has associated therewith a position corresponding to a two-dimensional position of a corresponding keyword segment in the corresponding document;
  comparing position of each node in the region adjacency graph with a position of each other node in the region adjacency graph; and
  connecting a first node to a second node if the second node has a position within a parameterized radius of the first node or if the first node and the second node have y-coordinates that differ within a parameterized range, wherein a set of connected nodes in a region adjacency graph for a document comprises a subgraph within the region adjacency graph.

15. A document processing system of claim 14 wherein each node has associated therewith a segmentation rectangle that encompasses a word segment corresponding to the node, and wherein a connection between the first node and the second node is represented as distance in pixels between top left corners of segmentation rectangles corresponding to the first node and the second node, and angle in degrees between the top left corners of the segmentation rectangles corresponding to the first node and the second node.

16. A document processing system of claim 13 wherein determining node attribute similarity between each document by performing fuzzy attributed graph isomorphism between each subgraph in each document comprises:
  comparing each subgraph in each document with each subgraph in each of the other documents.

17. A document processing system of claim 16 wherein comparing each subgraph in each document with each subgraph in each of the other documents comprises:
  employing a node matching function to match each node in each subgraph in each document with each node in each subgraph of each of the other documents; and
  employing an edge matching function to match each edge in each subgraph in each document with each edge in each subgraph in each of the other documents.

18. A document processing system of claim 17 wherein employing a node matching function to match each node in each subgraph in each document with each node in each subgraph of each of the other documents comprises:
  determining similarity of text between a selected first node and a selected second node by determining how many characters in the selected first node and the selected second node nodes are different and normalizing by the mean length of the text strings represented by the selected first node and the selected second node.

\* \* \* \* \*